US012208817B2

United States Patent
Kim et al.

(10) Patent No.: US 12,208,817 B2
(45) Date of Patent: Jan. 28, 2025

(54) METHOD, SERVER, AND COMPUTER PROGRAM FOR CREATING ROAD NETWORK MAP TO DESIGN DRIVING PLAN FOR AUTONOMOUS DRIVING VEHICLE

(71) Applicant: RideFlux Inc., Jeju-si (KR)

(72) Inventors: Jiwoong Kim, Jeju-si (KR); Himchan Cho, Hanam-si (KR); Ho Yun, Jeju-si (KR)

(73) Assignee: RideFlux Inc., Jeju-si (KR)

( * ) Notice: Subject to any disclaimer, the term of this patent is extended or adjusted under 35 U.S.C. 154(b) by 178 days.

(21) Appl. No.: 17/825,578

(22) Filed: May 26, 2022

(65) Prior Publication Data

US 2022/0379912 A1 Dec. 1, 2022

(30) Foreign Application Priority Data

May 27, 2021 (KR) .................. 10-2021-0068260

(51) Int. Cl.
*B60W 60/00* (2020.01)
*G01C 21/00* (2006.01)

(52) U.S. Cl.
CPC ....... *B60W 60/001* (2020.02); *G01C 21/3815* (2020.08); *G01C 21/3885* (2020.08); *B60W 2552/10* (2020.02); *B60W 2556/45* (2020.02)

(58) Field of Classification Search
CPC .......... B60W 60/001; B60W 2552/10; B60W 2556/45; G01C 21/3815; G01C 21/3885;
(Continued)

(56) References Cited

U.S. PATENT DOCUMENTS

| 2015/0345959 A1* | 12/2015 | Meuleau | G05D 1/0212 |
| | | | 701/23 |
| 2016/0200317 A1* | 7/2016 | Danzl | B60W 10/04 |
| | | | 701/25 |

(Continued)

FOREIGN PATENT DOCUMENTS

| JP | 2006-154967 A | 6/2006 |
| JP | 2007-199575 A | 8/2007 |

(Continued)

OTHER PUBLICATIONS

The extended European search report issued by the European Patent Office on Oct. 17, 2022, which corresponds to European Patent Application No. 17/825,578-1009 and is related to U.S. Appl. No. 17/825,578.

(Continued)

*Primary Examiner* — Elaine Gort
*Assistant Examiner* — Peter Y Ning
(74) *Attorney, Agent, or Firm* — Studebaker & Brackett PC

(57) ABSTRACT

Provided are a method, a server, and a computer program for creating a road network map to design a driving plan for an autonomous driving vehicle. A method of creating a road network map to design a driving plan for an autonomous driving vehicle is performed by a computing device and includes: generating road network data for an area; generating lattice road network data for a short-term driving plan for an autonomous driving vehicle using the generated road network data; and generating a crossable dipole graph for a long-term driving plan for the autonomous driving vehicle using the generated lattice road network data.

10 Claims, 16 Drawing Sheets

(58) Field of Classification Search
CPC ............. G01C 21/3446; G01C 21/343; G01C 21/3492; G01C 21/3453; G01C 21/3848; G01C 21/3863; G05D 1/0221; G06Q 50/40

See application file for complete search history.

(56) References Cited

U.S. PATENT DOCUMENTS

| | | | | |
|---|---|---|---|---|
| 2018/0129203 | A1* | 5/2018 | Tafti | G05D 1/0088 |
| 2018/0129214 | A1* | 5/2018 | D?Ring | G06V 20/58 |
| 2018/0356819 | A1* | 12/2018 | Mahabadi | B60W 30/00 |
| 2019/0079523 | A1* | 3/2019 | Zhu | G05D 1/0274 |
| 2019/0250000 | A1 | 8/2019 | Zhang et al. | |
| 2019/0317505 | A1* | 10/2019 | Li | G01C 21/3407 |
| 2019/0359205 | A1* | 11/2019 | Xu | B60W 30/0956 |
| 2019/0391585 | A1* | 12/2019 | Zhang | G05D 1/0214 |
| 2020/0385024 | A1* | 12/2020 | Wongpiromsarn | B60W 60/0015 |

FOREIGN PATENT DOCUMENTS

| | | |
|---|---|---|
| JP | 2008-215861 A | 9/2008 |
| JP | 2018-087764 A | 6/2018 |
| JP | 2018-173511 A | 11/2018 |
| JP | 2020-066428 A | 4/2020 |
| JP | 2020-163974 A | 10/2020 |
| KR | 10-2014-0117836 A | 10/2014 |
| KR | 10-2014-0126500 A | 10/2014 |
| KR | 10-2016-0057756 A | 5/2016 |
| KR | 10-2021-0048450 A | 5/2021 |
| KR | 10-2021-0057579 A | 5/2021 |

OTHER PUBLICATIONS

An Office Action mailed by the Korean Intellectual Property Office on Oct. 12, 2021, which corresponds to Korean Patent Application No. 10-2021-0068260 and is related to U.S. Appl. No. 17/825,578.

An Office Action mailed by the Japanese Patent Office on May 9, 2023, which corresponds to Japanese Patent Application No. 2022-086370 and is related to U.S. Appl. No. 17/825,578; with English language translation.

An Office Action; "Notice of Reasons for Refusal," mailed by the Japanese Patent Office on Nov. 28, 2023, which corresponds to Japanese Patent Application No. 2022-086370 and is related to U.S. Appl. No. 17/825,578; with English language translation.

* cited by examiner

METHOD, SERVER, AND COMPUTER PROGRAM FOR CREATING ROAD NETWORK MAP TO DESIGN DRIVING PLAN FOR AUTONOMOUS DRIVING VEHICLE

CROSS-REFERENCE TO RELATED APPLICATION

This application claims priority to and the benefit of Korean Patent Application No. 10-2021-0068260, filed on May 27, 2021, the disclosure of which is incorporated herein by reference in its entirety.

BACKGROUND

1. Field of the Invention

Various embodiments of the present invention relate to a method, a server, and a computer program for creating a road network map to design a driving plan for an autonomous driving vehicle, and more particularly, to a method of creating a road network map to design short-term and long-term driving plans for an autonomous driving vehicle.

2. Discussion of Related Art

For the convenience of users driving vehicles, vehicles tend to be provided with various sensors and electronic devices (e.g., an advanced driver assistance system (ADAS)), and in particular, the development of technologies for an autonomous driving system of a vehicle is being actively conducted.

Here, the autonomous driving system is a vehicle that recognizes the surrounding environment without driver intervention and automatically drives to a given destination by itself according to the recognized surrounding environment.

In general, in the case of autonomous driving system, various types of prior information are required to serve various purposes, such as providing a path to an autonomous driving vehicle. In particular, since road network data including information on lanes is essential data in that the road network data is prior information usable in various modules included in the autonomous driving system, a process of generating the road network data is essential.

SUMMARY OF THE INVENTION

The present invention is directed to providing a method, a server, and a computer program for creating a road network map to design a driving plan for an autonomous driving vehicle capable of building road network maps to design a short-term driving plan and a long-term driving plan for the autonomous driving vehicle by collecting various types of information on roads located in an area to generate road network data, and using the generated road network data to automatically generate lattice road network data and a crossable dipole graph.

Objects of the present invention are not limited to the objects described above, and other objects that are not described may be obviously understood by those skilled in the art from the following description.

According to an aspect of the present invention, there is provided a method of creating a road network map to design a driving plan for an autonomous driving vehicle, which is performed by a computing device, including: generating road network data for an area; generating lattice road network data for a short-term driving plan for an autonomous driving vehicle using the generated road network data; and generating a crossable dipole graph for a long-term driving plan for the autonomous driving vehicle using the generated lattice road network data.

The generating of the road network data may include: generating a first road network indicating a connection relationship between a first road located in the area and a second road connected to the first road; and generating a second road network representing a connection relationship between a plurality of first lanes included in the first road and a plurality of second lanes included in the second road using the generated first road network.

The generating of the first road network may include: generating a first road graph and a second road graph by graphing the first road and the second road, respectively, the generated first road graph and the generated second road graph including shape information, direction information, and semantic information on the first road and the second road, respectively; and generating the first road network by connecting the generated first road graph and the generated second road graph.

The generating of the first road network may include: dividing each of the first road and the second road according to a preset criterion to generate one or more independent roads and one or more dependent roads; and generating the first road network by connecting the generated one or more independent roads and the generated one or more dependent roads, and intersecting and connecting one independent road and one dependent road.

The generating of the second road network may include: generating a first lane graph indicating relative positions of each of the plurality of first lanes by graphing each of the plurality of first lanes and the plurality of second lanes, and a second lane graph indicating the relative positions of each of the plurality of second lanes generating a graph, the generated first lane graph and the generated second lane graph including semantic information on the plurality of first lanes and the plurality of second lanes, respectively; and generating the second road network by connecting the generated first road graph and the generated second road graph.

The generating of the lattice road network data may include: generating one or more lattice roads using the generated road network data; generating connection information between the generated one or more lattice roads; and generating the lattice road network connecting the generated one or more lattice roads according to the generated connection information.

The generating of the one or more lattice roads may include generating one or more lattice roads by grouping one or more lanes satisfying a preset condition among a plurality of lanes located in the area based on the generated road network data, the preset condition having the same property and being physically and legally movable.

The generating of the one or more lattice roads may include: setting a plurality of points on the generated one or more lattice roads in a lattice form; and matching and storing geometric information and semantic information on the lattice road where each of the plurality of set points is located at each of the set points.

The generating of the connection information includes determining whether the generated one or more lattice roads intersect, and generating connection information indicating a connection relationship between the generated one or more lattice roads based on the determined intersection, the form of the generated connection information being determined based on a length of an intersection section between the generated one or more lattice roads.

The generating of the crossable dipole graph may include: determining whether movement is possible between one or more lanes included in a first lattice road and one or more lanes included in a second lattice road based on the generated lattice road network data; and generating the crossable dipole graph connecting one or more lanes included in the first lattice road and one or more lanes included in the second lattice road based on the determined movement possibility.

According to another aspect of the present invention, there is provided a server for creating a road network map to design a driving plan for an autonomous driving vehicle, the server including: a processor; a network interface; a memory; and a computer program loaded into the memory and executed by the processor, in which computer program includes an instruction to generate road network data for an area; an instruction to generate lattice road network data for a short-term driving plan for an autonomous driving vehicle using the generated road network data; and an instruction to generate a crossable dipole graph for a long-term driving plan for the autonomous driving vehicle using the generated lattice road network data.

According to still another aspect of the present invention, there is provided a computer program recorded on a computer-readable recording medium, wherein the computer program is coupled to a computing device and stored in the computer-readable recording medium in order to execute the following steps: generating road network data for an area; generating lattice road network data for a short-term driving plan for an autonomous driving vehicle using the generated road network data; and generating a crossable dipole graph for a long-term driving plan for the autonomous driving vehicle using the generated lattice road network data.

Other specific details of the present invention are included in the detailed description and drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
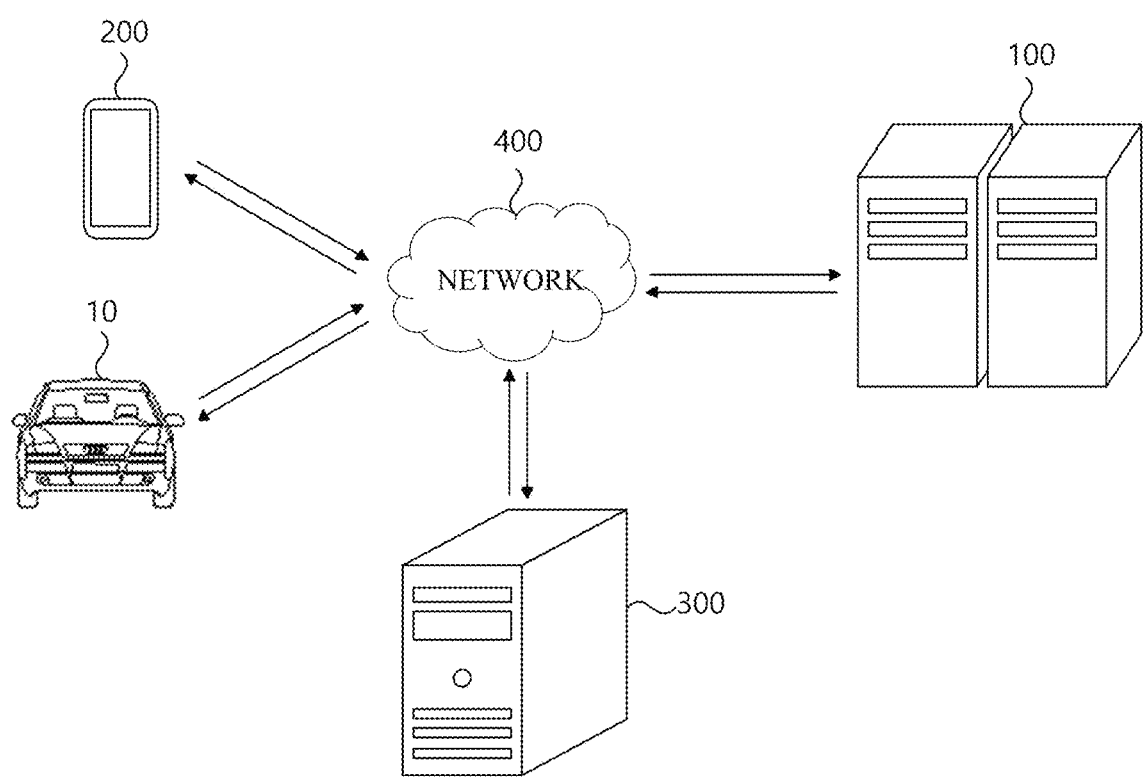
FIG. 1 is a diagram illustrating a system for creating a road network map to design a driving plan for an autonomous driving vehicle according to an embodiment of the present invention.

Various advantages and features of the present invention and methods accomplishing them will become apparent from the following description of embodiments with reference to the accompanying drawings. However, the present invention is not limited to the embodiments to be described below, but may be implemented in various different forms, these embodiments will be provided only in order to make the present invention complete and allow those skilled in the art to completely recognize the scope of the present invention, and the present invention will be defined by the scope of the claims.

Terms used in the present specification are for explaining embodiments rather than limiting the present invention. Unless otherwise stated, a singular form includes a plural form in the present specification. Throughout this specification, the term "comprise" and/or "comprising" will be understood to imply the inclusion of stated constituents but not the exclusion of any other constituents. Like reference numerals refer to like components throughout the specification and "and/or" includes each of the components described and includes all combinations thereof. Although "first," "second," and the like are used to describe various components, it goes without saying that these components are not limited by these terms. These terms are used only to distinguish one component from other components. Therefore, it goes without saying that a first component described below may be a second component within the technical scope of the present invention.

Unless defined otherwise, all terms (including technical and scientific terms) used in the present specification have the same meanings commonly understood by those skilled in the art to which the present invention pertains. In addition, terms defined in commonly used dictionary are not ideally or excessively interpreted unless explicitly defined otherwise.

Further, the term "unit" or "module" used herein means a hardware component such as software, FPGA, or ASIC and performs predetermined functions. However, the term "unit"

or "module" is not limited to software or hardware. The "unit" or "module" may be configured to be stored in a storage medium that can be addressed or may be configured to regenerate one or more processors. Accordingly, for example, the "unit" or "module" includes components such as software components, object-oriented software components, class components, and task components, processors, functions, attributes, procedures, subroutines, segments of a program code, drivers, firmware, a microcode, a circuit, data, a database, data structures, tables, arrays, and variables. Functions provided in components, and the "units" or "modules" may be combined into fewer components, and "units" or "modules" may be further separated into additional components.

Spatially relative terms "below," "beneath," "lower," "above," "upper," and the like may be used to easily describe the correlation between one component and other components as illustrated in the drawings. The spatially relative terms should be understood as terms including different directions of components during use or operation in addition to the directions illustrated in the drawings. For example, when a component illustrated in the drawings is turned, a component described as "below" or "beneath" another component may be placed "above" the other component. Therefore, the illustrative term "below" may include both downward and upward directions. The components can also be aligned in different directions, and therefore the spatially relative terms can be interpreted according to the alignment.

In this specification, the computer is any kind of hardware device including at least one processor, and may be understood as including a software configuration which is operated in the corresponding hardware device according to the embodiment. For example, the computer may be understood to be any of a smart phone, a tablet personal computer (PC), a desktop, a notebook, or a user client or application running on each device, but is not limited thereto.

Hereinafter, embodiments of the present invention will be described in detail with reference to the accompanying drawings.

Each step described in the present specification is described as being performed by a computer, but subjects of each step are not limited thereto, and according to embodiments, at least some steps can also be performed on different devices.

Here, this specification relates to an autonomous driving vehicle, and describes the method of creating a road network map as prior data for designing short-term and long-term driving plans for an autonomous driving vehicle, but is not limited thereto, and may be applied to semi-autonomous driving vehicles or general vehicles that do not use autonomous driving functions.

FIG. 1 is a diagram illustrating a system for creating a road network map to design a driving plan for an autonomous driving vehicle according to an embodiment of the present invention.

Referring to FIG. 1, the system for creating a road network map to design a driving plan for an autonomous driving vehicle according to the embodiment of the present invention includes a server 100 for creating a road network map, a user terminal 200, and an external server 300.

Here, the system for creating a road network map to design a driving plan for an autonomous driving vehicle illustrated in FIG. 1 is based on an embodiment, and components thereof are not limited to the embodiment illustrated in FIG. 1, and may be added, changed, or deleted as necessary.

In an embodiment, the server 100 for generating a road network map may create a road network map for a driving plan for the autonomous driving vehicle 10. For example, the server 100 for creating a road network map may generate road network data by collecting all information on roads (e.g., information on road structures, etc.) located in an area, generate lattice road network data for a short-term driving plan for the autonomous driving vehicle 10 using the generated road network data, and generate a crossable dipole graph for a long-term driving plan for the autonomous driving vehicle 10 using the generated lattice road network data.

In various embodiments, the server 100 for creating a road network map may be connected to a user terminal 200 or a vehicle (e.g., autonomous driving vehicle 10) passing through the area through a network 400, may collect sensor data for the area from the user terminal 200 or the vehicle, and generate the road network data for the area using the collected sensor data.

In addition, the server 100 for creating a road network map may be connected to an external server 300 (e.g., a server of the Ministry of Land, Infrastructure and Transport) through the network 400, and generate the road network data by collecting various types of information on roads located in the area through the external server 300.

In addition, the server 100 for creating a road network map may automatically generate the lattice road network data in response to the generation of the road network data for the area, and automatically generate the crossable dipole graph again in response to the generation of the lattice road network data. However, the present invention is not limited thereto.

Here, the user terminal 200 is a wireless communication apparatus in which portability and mobility are guaranteed, and examples thereof may include all types of handheld-based wireless communication devices such as a navigation system, a personal communication system (PCS), a global system for mobile communication (GSM), a personal digital cellular (PDC), a personal handyphone system (PHS), a personal digital assistant (PDA), international mobile telecommunication (IMT)-2000, code division multiple access (CDMA)-2000, W-code division multiple access (W-CDMA), a wireless broadband Internet (WiBro) terminal, a smart phone, a smart pad, a tablet PC, and the like, but are not limited thereto.

In addition, here, the network 400 may be a connection structure capable of exchanging information between respective nodes such as a plurality of terminals and servers. For example, the network 400 includes a local area network (LAN), a wide area network (WAN), the Internet (world wide web (WWW)), a wired/wireless data communication network, a telephone network, a wired/wireless television communication network, and the like.

In addition, here, the wireless data communication network includes 3G, 4G, 5G, 3rd Generation Partnership Project (3GPP), 5th Generation Partnership Project (5GPP), Long Term Evolution (LTE), World Interoperability for Microwave Access (WiMAX), wireless fidelity (Wi-Fi), the Internet, a local area network (LAN), a wireless local area network (Wireless LAN), a wide area network (WAN), a personal area network (PAN), radio frequency (RF), a Bluetooth network, a near-field communication (NFC) network, a satellite broadcast network, an analog broadcast network, a digital multimedia broadcasting (DMB) network, and the like, but is not limited thereto.

In various embodiments, the server 100 for creating a road network map may generate a driving plan for controlling the autonomous driving vehicle 10 using the lattice road network data and the crossable dipole graph. Here, the driving plan may be not only a plan for generating a driving path from a current location of the autonomous driving vehicle 10 to a destination and controlling the autonomous driving vehicle 10 to move based on the generated driving path, but also a plan for various controls such as a traveling lane, a lane change location, speed or acceleration control, and steering angle control.

In one embodiment, the external server 300 may be connected to the server 100 for creating a road network map through the network 400, and the server 100 for creating a road network map may provide various types of information (e.g., road network map creation rules) necessary to perform the road network map creation process for a driving plan for the autonomous driving vehicle 10, or receive and store data (e.g., road network data, lattice road network data, a crossable dipole graph, etc.) generated by performing a process of creating a road network map for a driving plan for the autonomous driving vehicle 10. For example, the external server 300 may be a storage server provided separately outside of the server 100 for creating a road network map, but is not limited thereto. Hereinafter, a hardware configuration of the server 100 for creating a road network map that performs the process of creating a road network map for a driving plan for an autonomous driving vehicle will be described with reference to FIG. 2.

Figure 2:
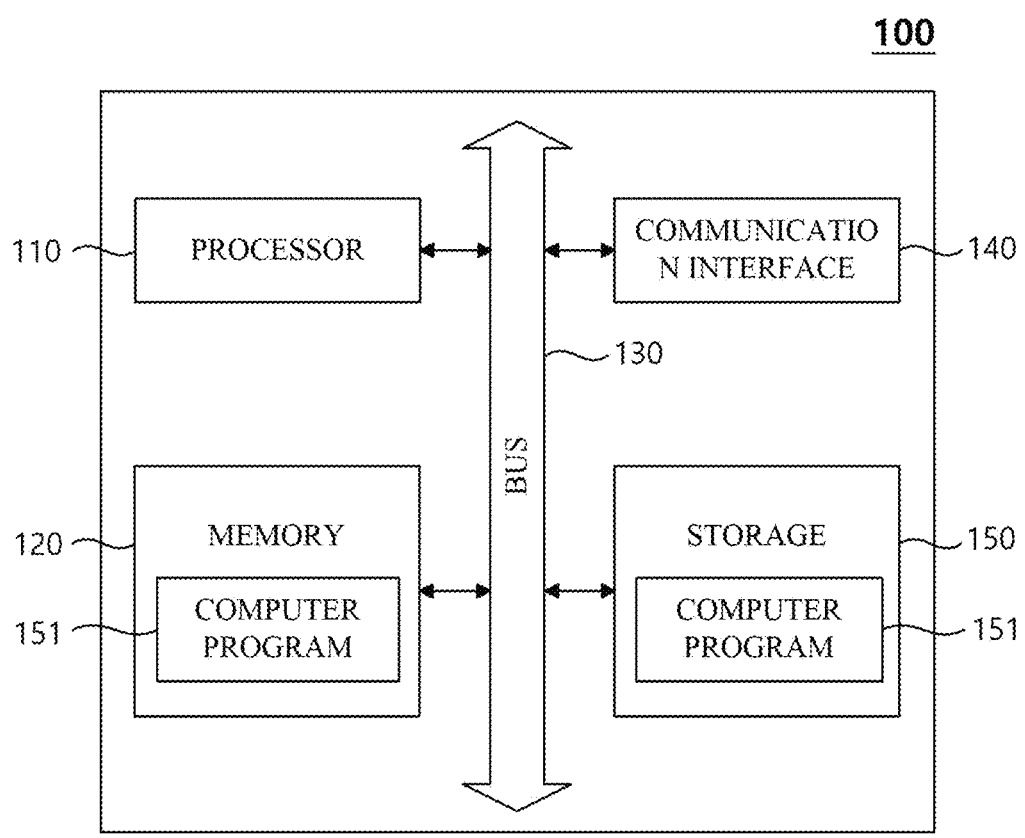
FIG. 2 is a hardware configuration diagram of a server for creating a road network map to design a driving plan for an autonomous driving vehicle according to another embodiment of the present invention.

FIG. 2 is a hardware configuration diagram of a server for creating a road network map to design a driving plan for an autonomous driving vehicle according to another embodiment of the present invention.

Referring to FIG. 2, the server 100 for creating a road network map (hereinafter, "server 100") according to another embodiment of the present invention may include one or more processors 110, a memory 120 into which a computer program 151 executed by the processor 110 is loaded, a bus 130, a communication interface 140, and a storage 150 for storing the computer program 151. Here, only the components related to the embodiment of the present invention are illustrated in FIG. 2. Accordingly, one of ordinary skill in the art to which the present invention pertains may understand that general-purpose components other than the components illustrated in FIG. 2 may be further included.

The processor 110 controls an overall operation of each configuration of the server 100. The processor 110 may be configured to include a central processing unit (CPU), a microprocessor unit (MPU), a micro controller unit (MCU), a graphics processing unit (GPU), or any type of processor well known in the technical field of the present invention.

In addition, the processor 110 may perform an operation for at least one application or program for executing the method according to the embodiments of the present invention, and the server 100 may include one or more processors.

In various embodiments, the processor 110 may further include a random access memory (RAM) (not illustrated) and a read-only memory (ROM) for temporarily and/or permanently storing signals (or data) processed in the processor 110. In addition, the processor 110 may be implemented in the form of a system-on-chip (SoC) including at least one of the graphics processing unit, the RAM, and the ROM.

The memory 120 stores various types of data, commands and/or information. The memory 120 may load the computer program 151 from the storage 150 to execute methods/operations according to various embodiments of the present invention. When the computer program 151 is loaded into the memory 120, the processor 110 may perform the methods/operations by executing one or more instructions constituting the computer program 151. The memory 120 may be implemented as a volatile memory such as RAM, but the technical scope of the present disclosure is not limited thereto.

The bus 130 provides a communication function between components of the server 100. The bus 130 may be implemented as any of various types of buses, such as an address bus, a data bus, and a control bus.

The communication interface 140 supports wired/wireless Internet communication of the server 100. In addition, the communication interface 140 may support various communication methods other than Internet communication. To this end, the communication interface 140 may be configured to include a communication module well known in the art. In some embodiments, the communication interface 140 may be omitted.

The storage 150 may non-temporarily store the computer program 151. When performing the process of creating a road network map for a driving plan for an autonomous driving vehicle through the server 100, the storage 150 stores various types of information necessary to provide the process of creating a road network map for a driving plan for an autonomous driving vehicle.

The storage 150 may be configured to include a nonvolatile memory, such as a ROM, an EPROM, an EEPROM, or a flash memory, a hard disk, a removable disk, or any well-known computer-readable recording medium in the art to which the present invention belongs.

The computer program 151 may include one or more instructions to, when loaded into the memory 120, cause the processor 110 to perform the methods/operations according to various embodiments of the present invention. That is, the processor 110 may perform the methods/operations according to various embodiments of the present invention by executing the one or more instructions.

In one embodiment, the computer program 151 may include one or more instructions to perform a method of creating a road network map to design a driving plan for an autonomous driving vehicle including generating road network data for an area, generating lattice road network data for a short-term driving plan for an autonomous driving vehicle using the generated road network data, and generating a crossable dipole graph for a long-term driving plan for the autonomous driving vehicle using the generated lattice road network data.

Operations of the method or algorithm described with reference to the embodiment of the present invention may be directly implemented in hardware, in software modules executed by hardware, or in a combination thereof. The software module may reside in a RAM, a ROM, an EPROM, an EEPROM, a flash memory, a hard disk, a removable disk, a CD-ROM, or in any form of computer readable recording medium known in the art to which the invention pertains.

The components of the present invention may be embodied as a program (or application) and stored in a medium for execution in combination with a computer which is hardware. The components of the present invention may be executed in software programming or software elements, and similarly, embodiments may be in programming or scripting language such as C, C++, Java, or assembler, including various algorithms implemented in a combination of data structures, processes, routines, or other programming constructions. Functional aspects may be implemented with algorithms executed on one or more processors. Hereinafter, the method of creating a road network map to design a driving plan for an autonomous driving vehicle performed by the server 100 will be described with reference to FIGS. 3 to 16C.

Figure 3:
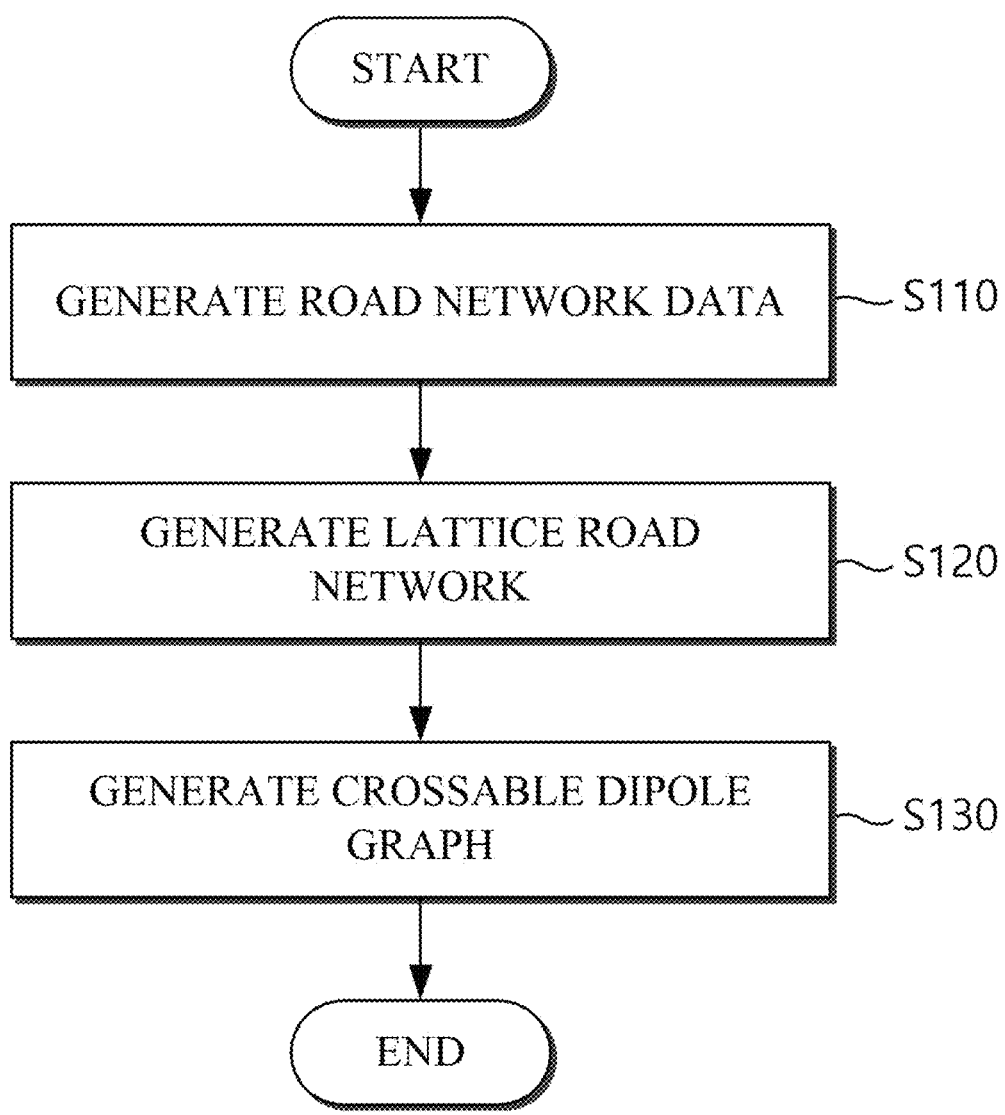
FIG. 3 is a flowchart of a method of creating a road network map to design a driving plan for an autonomous driving vehicle according to another embodiment of the present invention.

FIG. 3 is a flowchart of the method of creating a road network map to design a driving plan for an autonomous driving vehicle according to another embodiment of the present invention.

Referring to FIG. 3, in operation S110, the server 100 may generate road network data for an area. For example, the server 100 may be connected to the user terminal 200 or a vehicle (e.g., an autonomous driving vehicle 10) passing through the area through a network 400, may collect sensor data for the area from the user terminal 200 or the vehicle, and generate the road network data for the area using the collected sensor data.

Here, the sensor data may refer to all information related to a structure of a road located in the area, image data generated by photographing an area through a camera sensor, LiDAR sensor data collected through a LiDAR sensor, a radar sensor data collected through a radar sensor, and location data collected through a GPS sensor.

In addition, the server 100 for creating a road network map may be connected to an external server 300 (e.g., a server of the Ministry of Land, Infrastructure and Transport) through the network 400, and generate the road network data by collecting various types of information on roads located in the area through the external server 300.

Here, the road network data may refer to data used to design a driving plan for an autonomous driving vehicle, and data including essential information about a road structure.

In various embodiments, the road network data may include information (e.g., road structure, shape, direction, geometric information, attribute information (semantic information), etc.) for automatically generating lattice road network data and a crossable dipole graph through operations S120 and S130, which will be described below, and may be stored in a structure that is easy for users to edit directly.

In various embodiments, the server 100 may generate a road network (e.g., FIG. 5) that indicates a connection relationship between a first road located in an area and a second road connected to the first road, and a connection relationship between lanes included in the first road and the second road. Hereinafter, this will be described with reference to FIGS. 4 to 11C.

Figure 4:
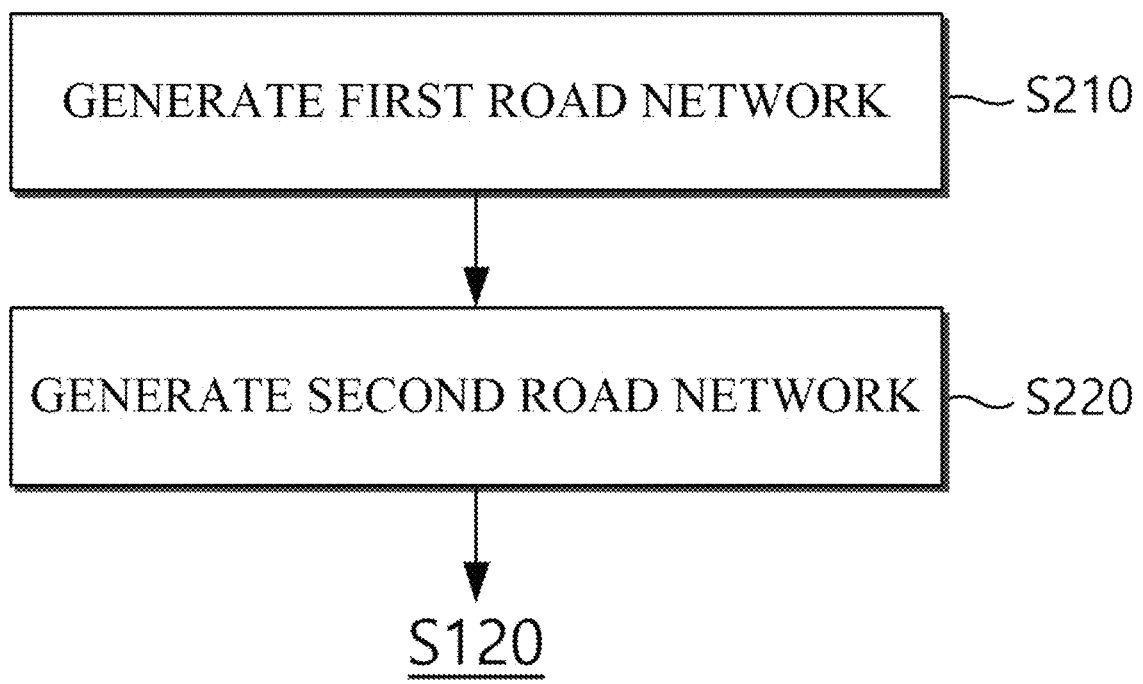
FIG. 4 is a flowchart of a method of generating road network data in various embodiments.

FIG. 4 is a flowchart of a method of generating road network data in various embodiments.

Referring to FIG. 4, in operation S210, the server 100 may generate a first road network indicating the connection relationship between the first road located in the area and the second road connected to the first road.

Figure 6:
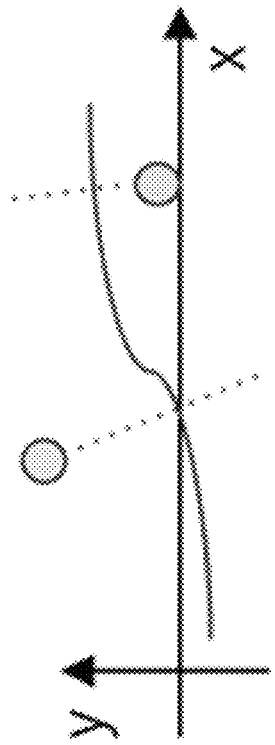
FIG. 6 is a diagram exemplarily illustrating a road graph applicable to various embodiments.
Figure 6:
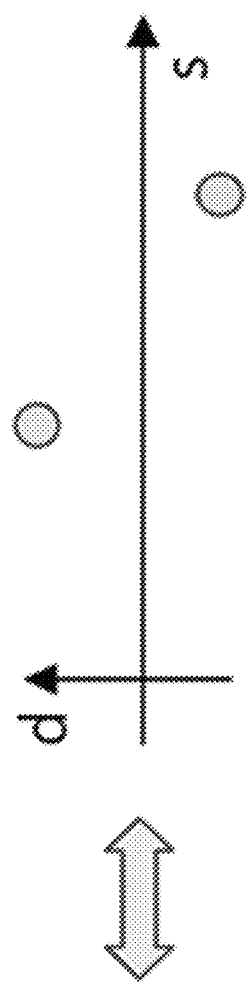

First, the server 100 may generate a first road graph and a second road graph by graphing each of the first road and the second road. For example, as illustrated in FIG. 6, the server 100 may generate the first road graph and the second road graph by graphing each of the first road and the second road using a first graph generation model.

Here, the first graph generation model may be a spline curvature path (SCP) model that estimates an $N^{th}$-order polynomial function for a road using a partial polynomial and graphs the estimated $N^{th}$-order polynomial function as a graph of an S-D domain. For example, the server 100 may generate a first road graph and a second road graph for each of the first road and the second road by estimating the $N^{th}$-order polynomial function for each of the first and second roads based on shape information on the first and second roads to be graphed and substituting various data values (e.g., coordinate values (X and Y) and boundary conditions for start and finish points of the first road and the second road, and continuity conditions for curvatures of the first road and the second road, etc.) into the estimated $N^{th}$-order polynomial function to determine the $N^{th}$-order polynomial function. However, the present invention is not limited thereto, and various methods of graphing the first road and the second road may be applied.

Here, the first road graph and the second road graph may include geometric information on the first road and the second road, respectively. For example, the first road graph and the second road graph may include shape information on the first road and the second road, respectively. As an example, since the first road graph and the second road graph estimate a polynomial function indicating the shape information on the road through the SCP model, and are graphed by the estimated polynomial function, the shape information on the road may be expressed with one representative line. In addition, the first road graph and the second road graph may include direction information on the first road and the second road, respectively.

In addition, the first road graph and the second road graph may include attribute information on the first road and the second road, respectively. For example, the first road graph and the second road graph may include explicitness (example: explicit road: road where road markings are explicitly marked, implicit road: road where road markings such as a U-turn section or an intersection are not explicitly marked) of the first road and the second road, respectively, and information on whether or not there is a protection area (e.g., disabled protection area, child protection area, elderly protection area, etc.)

Figure 5:
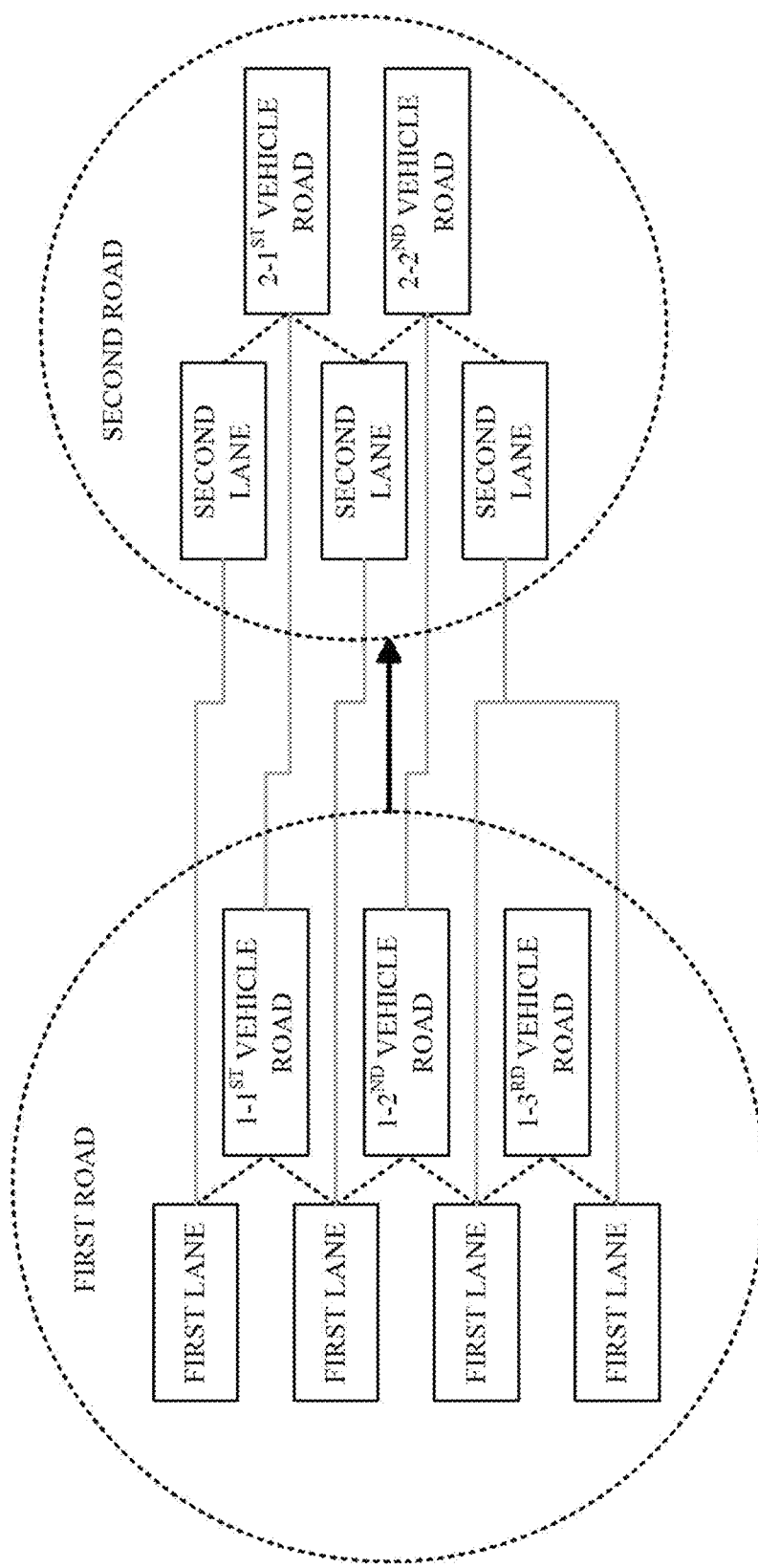
FIG. 5 is a diagram exemplarily illustrating a form of a road network generated according to the method of generating network data in various embodiments.

Thereafter, the server 100 may generate the first road network by connecting the first road graph and the second road graph. Here, the first road network may be represented in the form of directly connecting the first road graph and the second road graph, but is not limited thereto, and as illustrated in FIG. 5, may be expressed in the form of connecting an indicator indicating the first road and a second road network and an indicator indicating the second road, and thus may be implemented in a form that makes it easy for users to directly modify and edit the road network.

In various embodiments, the server 100 may generate one or more independent roads and one or more dependent roads by dividing each of the first road and the second road according to a preset criterion, and generate the first road network by connecting one or more independent roads and one or more dependent roads, but intersect and connect one independent road and one dependent road.

Figure 10:
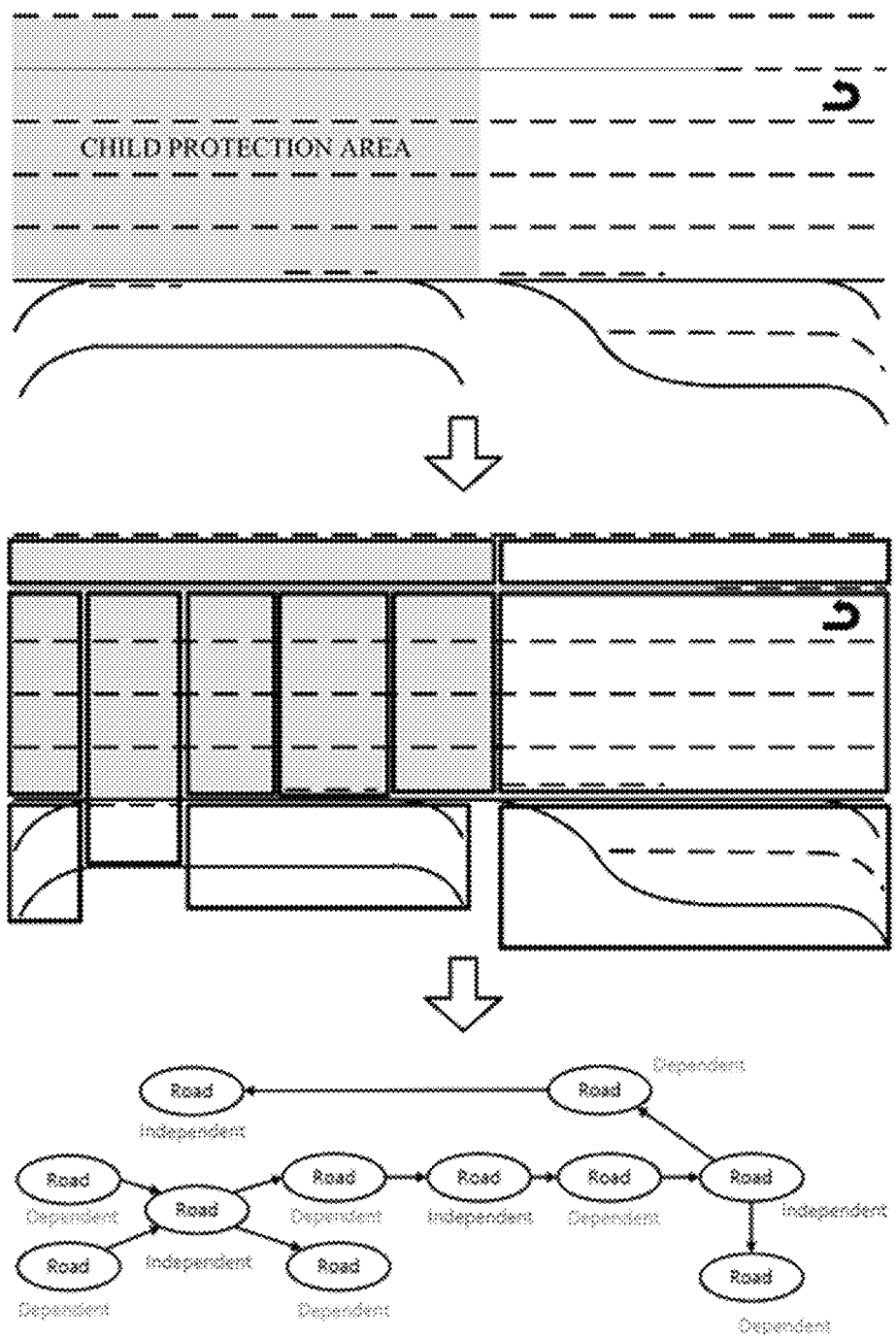
FIG. 10 is a diagram illustrating a process of connecting an independent road and a dependent road in various embodiments.

For example, as illustrated in FIG. 10, the server 100 may generate a plurality of unit roads by dividing each of the first road and the second road according to a preset criterion (e.g., whether it is possible to move to another road), and classify the plurality of generated unit roads as independent roads or dependent roads according to attributes of each of the plurality of unit roads.

Here, the independent road may be a unit road that may be selected from two or more unit roads located in different directions and connected, or connected by selecting two or more unit roads located in different directions, and the dependent road may be a unit road that may be selected from one unit road and connected or connected only by selecting one unit road.

In this case, the server 100 may generate a plurality of unit roads by dividing each of the first road and the second road, and when each of the plurality of unit roads is classified as an independent road or a dependent road according to attributes, but two or more consecutive unit roads are classified as independent roads or two or more consecutive unit roads are classified as dependent roads, may integrate two or more consecutive unit roads into one unit road so that one independent road and one dependent road may be arranged to be intersected.

Thereafter, the server 100 connects each of the plurality of independent roads and the plurality of dependent roads generated according to the above method, but may alternately connect one independent road and one dependent road. For example, the server 100 first arranges unit roads classified as independent roads among a plurality of unit roads, and then arranges dependent roads between the arranged independent roads so that one independent road and one dependent road may be alternately connected.

As an example, the server 100 may provide a user interface (UI) (e.g., a graphical user interface (GUI)) for the generation of the road network data to the user terminal 200, and may first arrange independent roads according to a first user input obtained from the user through the UI. Thereafter, the server 100 may arrange dependent roads between independent roads according to a second user input obtained from a user through the UI, but by arranging the dependent road and automatically connecting the independent road and the dependent road, may alternately connect one independent road and one dependent road.

Thereafter, the server 100 may edit a specific independent road according to the user input upon obtaining a user input for editing a specific independent road from a user through the UI, and may also edit a specific independent road to automatically edit a dependent road connected to the specific independent road (automatically edit the independent roads according to the locations of the independent roads that are connected to both sides of the dependent road).

When a plurality of unit roads for a road are not divided and connected as described above, whenever a connection relationship between roads is modified in a process of editing a road network by a user, the modified information is propagated, and thus the entire road network is continuously changed, and there is a problem in that it is difficult to manage and maintain the road network.

In consideration of this, the method of creating a road network map to design a driving plan for an autonomous driving vehicle according to various embodiments of the present invention does not simply connect the entire first road and the second road, but subdivides and connects the first road and the second road, so that it is possible to facilitate maintenance and editing processing for the road network.

In operation S220, the server 100 may generate the second road network representing the connection relationship between the plurality of first lanes included in the first road and the plurality of second lanes included in the second road using the first road network.

Figure 7:
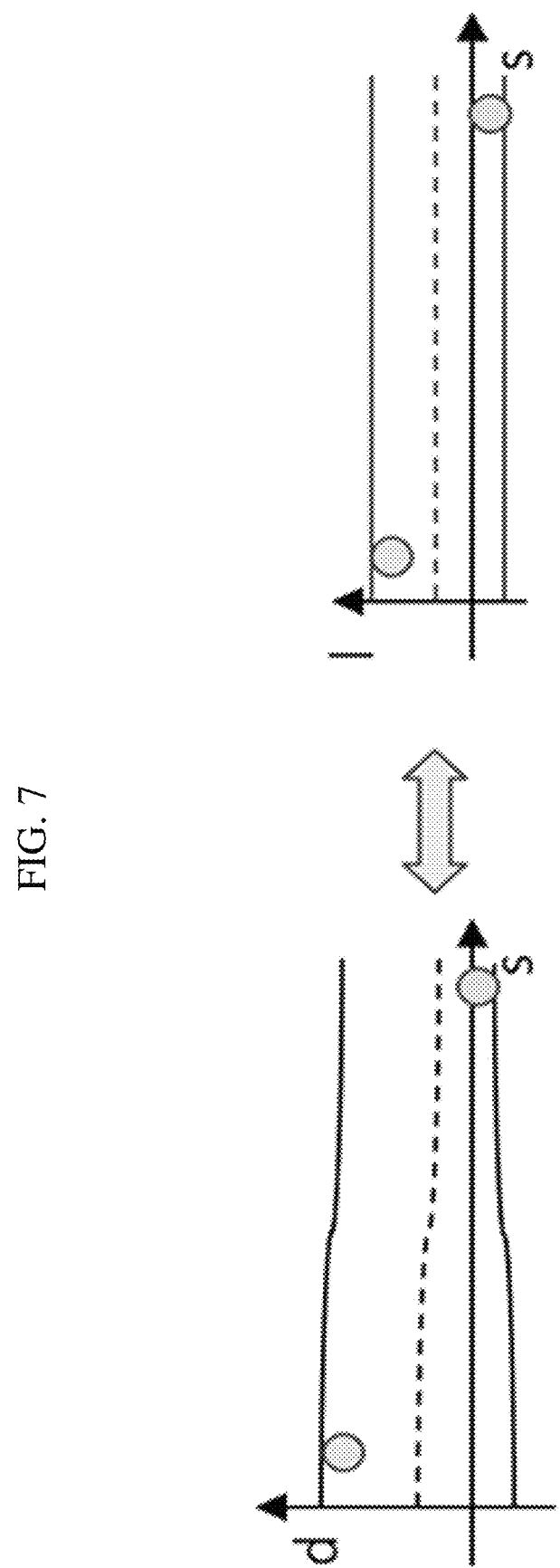
FIGS. 7 and 8 are diagrams exemplarily illustrating a lane graph applicable to various embodiments.

First, the server 100 graphs each of the plurality of first lanes and the plurality of second lanes to generate a first lane graph indicating relative positions of each of the first lane graph and a second lane graph indicating relative positions of each of the plurality of first lanes. For example, as illustrated in FIG. 7, the server 100 may generate the first lane graph and the second lane graph for each of the plurality of first lanes and the plurality of second lanes using a second graph generation model.

Here, the second graph generation model may be a spline path (SP) model that is graphed by a graph in an S-L domain indicating the relative positions of the plurality of first lanes and the plurality of second lanes by using the first road graph and the second road graph graphed in the S-D domain. For example, the server 100 may select a reference first lane from the plurality of first lanes, and generate a straight line graph (L=+0.5) connecting a start point ($S_{START}$) to a finish point ($S_{FINISH}$) of the selected reference first lane. Thereafter, the server 100 may generate a straight line graph for the remaining first lanes based on the reference first lane, but generate a straight line graph (example: the first lane located above the reference first lane is L=+1.5, and the first lane located just below the reference first lane is L=−0.5) in consideration of the relative position with the reference first lane. Through this, each of the first lane graph and the second lane graph may include geometric information on the relative positions of the plurality of first lanes and the plurality of second lanes, respectively.

Also, the first lane graph and the second lane graph may include the attribute information on each of the plurality of first lanes and the plurality of second lanes. For example, the first lane graph and the second lane graph include information such as type information (e.g., solid line, dotted line, double line (double solid line, solid line and dotted line, or dotted line and solid line)) on each of the plurality of first lanes and the plurality of second lanes and color information (e.g., white, yellow, blue).

Thereafter, the server 100 may generate the second road network by connecting the first road graph and the second road graph. For example, the server 100 may not only connect a feature point for the first lane graph and a feature point (e.g., a center point) for the second lane graph, but may also connect all points located at a point where the plurality of first lanes and the plurality of second lanes intersect in the form of a smooth curve.

Figure 9A:
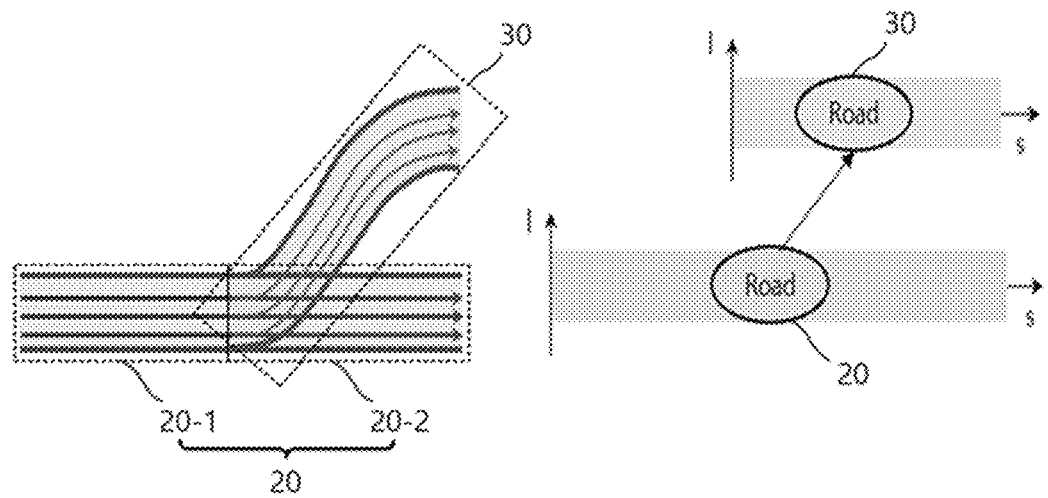
FIGS. 9A and 9B are diagrams exemplarily illustrating a form of connecting a first road graph, a second road graph, a first lane graph, and a second lane graph in various embodiments.
Figure 9B:
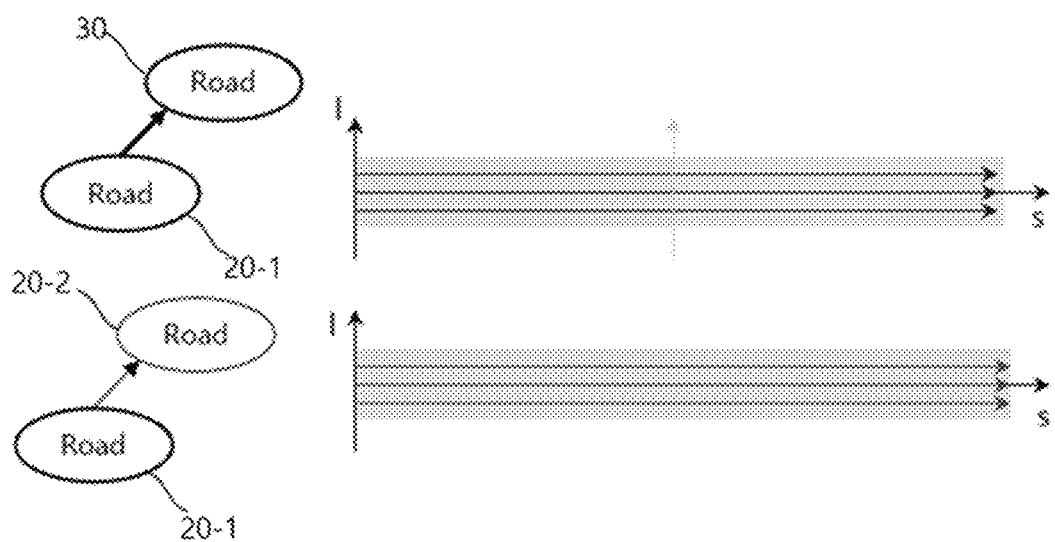

For example, as illustrated in FIGS. 9A and 9B, when a first road 20 including a plurality of first lanes and a second road 30 including a plurality of second lanes are connected (e.g., FIG. 9A), all points where the plurality of first lanes and the plurality of second lanes intersect may be connected with a smooth curve (e.g., a straight line). That is, even if the positions of the plurality of first lanes and the plurality of second lanes matched and connected to each of the plurality of first lanes are different from each other, when the relative positions are the same, the first lanes and the second lanes are arranged at the same position on the S-L coordinates, so that, by connecting the first lane graph and the second lane graph with a straight line as illustrated in FIGS. 9A and 9B, it is possible to generate a straight graph in one S-L domain (e.g., FIG. 9B).

In this case, as illustrated in FIG. 9A, in the case of the first road 20, since a path continuously traveling on the first road 20 without moving to another road (second road 30) and a driving path moving from the first road 20 to the second road 30, that is, two driving paths, may be generated, the first road 20 may be divided into two unit roads 20-1 and 20-2 based on an intersection of the first road 20 and the second road 30, and as illustrated in FIG. 9B, two second road networks may be generated in consideration of each driving path.

Figure 8:
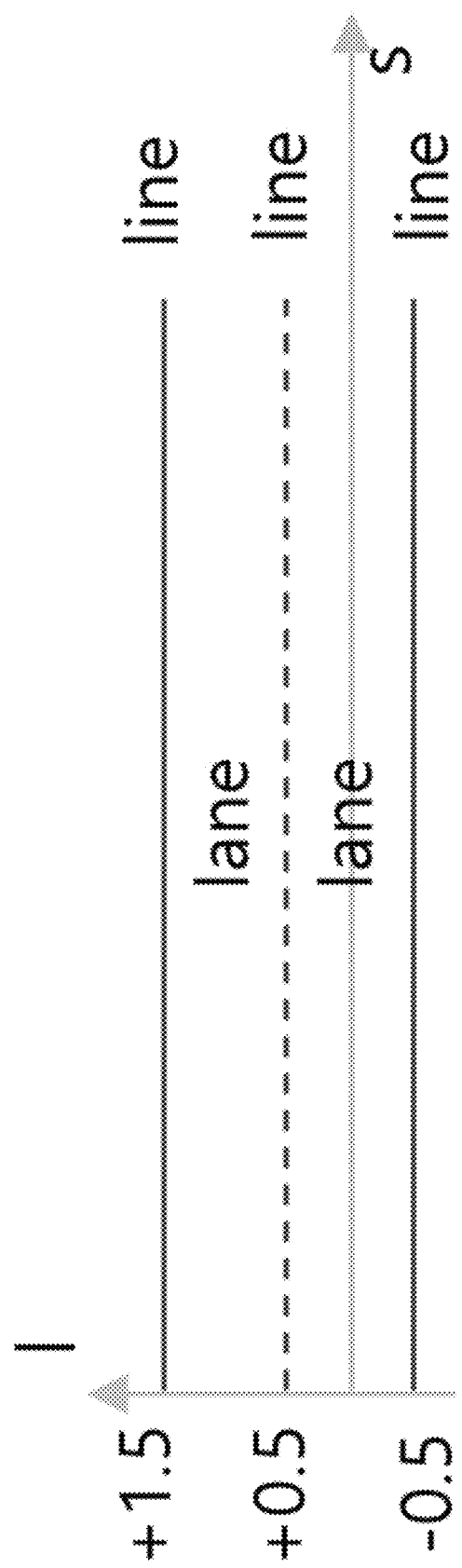

Here, one or more lanes included in each of the first road and the second road may be expressed by interpolation of two lane graphs adjacent to each other as illustrated in FIG. 8. That is, the server 100 does not separately generate a road network connecting the lanes included in each of the first road and the second road, but may express the connection state between one or more lanes included in each of the first road and the second road on the second road network generated by connecting the first lane graph and the second lane graph.

Here, one or more lanes are expressed by interpolation of two lane graphs adjacent to each other, and an interval between two lanes adjacent to each other is set (e.g., 1) according to the relative positions regardless of an actual distance, and therefore does not include information on an actual width of a lane.

Here, lanes located on each of the first road and the second road included in the second road network may include the attribute information on the road. For example, lanes located on each of the first road and the second road include direction indication information (e.g., go straight, none, left turn, right turn, straight right turn, straight left turn, no going straight, U-turn, etc.), type information (e.g., general lanes, bus-only lanes (all-day, peak-hour, etc.) and speed information (e.g., prescribed speed, minimum prescribed speed, maximum prescribed speed, standard driving path, etc.). In this case, each of the lanes included in each of the first road and the second road may include two or more pieces of attribute information.

Meanwhile, in generating a driving plan for the autonomous driving vehicle 10, there may be a case in which the autonomous driving vehicle 10 inevitably needs to drive out of a designated lane as an emergency situation occurs (for example, when a vehicle in front of the autonomous driving vehicle 10 that is driving according to a driving plan stops suddenly, the autonomous driving vehicle 10 evades to a shoulder to avoid the sudden stop of the vehicle, or a case in which, when an obstacle is located in a lane on which the autonomous driving vehicle 10 is driving in a round-trip two-lane section, the autonomous driving vehicle 10 inevitably needs to drive in reverse in a lane in an opposite direction, etc.

Figure 11A:
FIGS. 11A to 11C show diagrams exemplarily illustrating a form in which a driving plan is set in an area outside a road on a road graph in various embodiments.
Figure 11B:
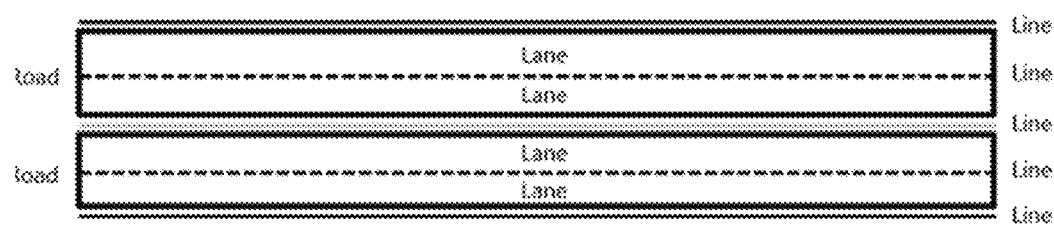
Figure 11C:
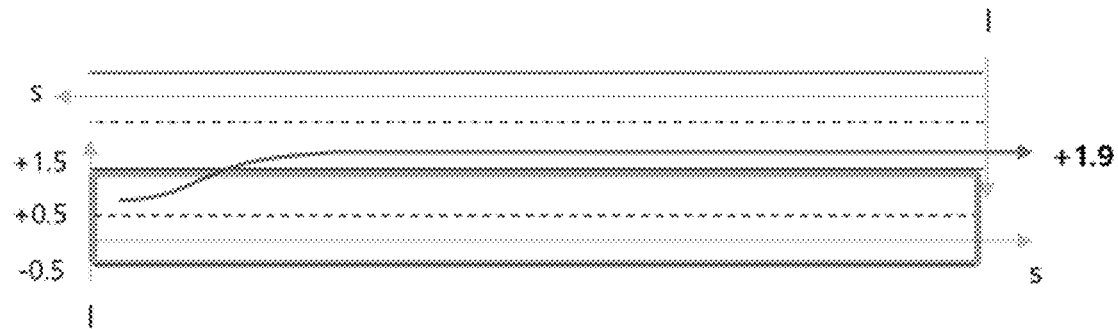

In consideration of this, the server 100 generates the second road network according to the above method, but, as illustrated in FIGS. 11A to 11C, in the first and second lane graphs, the server 100 expands and generates an area for an upper part (considering reverse driving in an opposite direction) of an uppermost lane and an area for a lower part (considering driving on a shoulder) of a lowermost lane, and thus may enable a driving plan to deviate from a designated lane as changes occur during driving as described above.

Referring back to FIG. 3, in operation S120, the server 100 may generate lattice road network data using the road network data generated in operation S110. Here, the lattice road network data may be data used for a short-term driving plan for the autonomous driving vehicle 10.

In various embodiments, the server 100 may set one or more lattice roads for an area using the road network data, and define a connection relationship between the one or more set lattice roads, thereby creating the lattice road network. Hereinafter, this will be described with reference to FIGS. 12 to 14.

Figure 12:
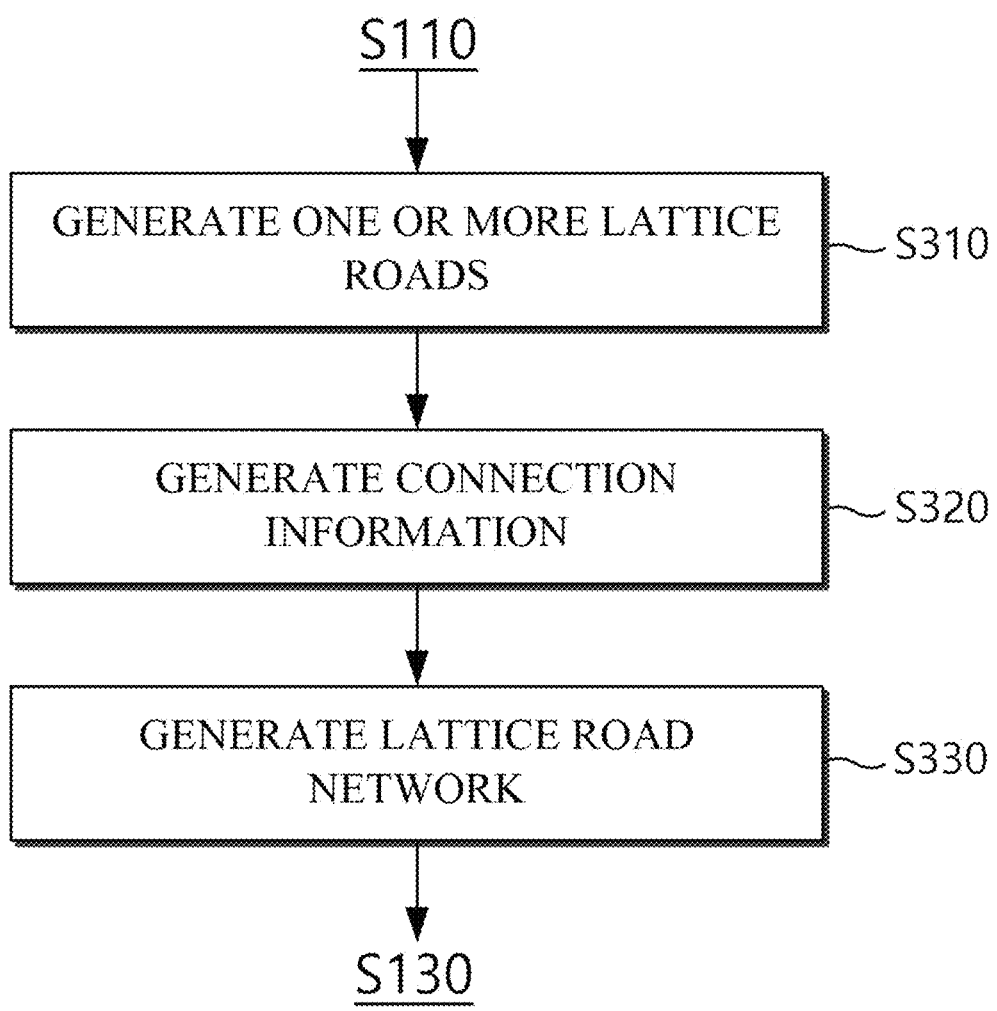
FIG. 12 is a flowchart of a method of generating lattice road network data in various embodiments.

FIG. 12 is a flowchart of a method of generating lattice road network data in various embodiments.

Figure 13A:
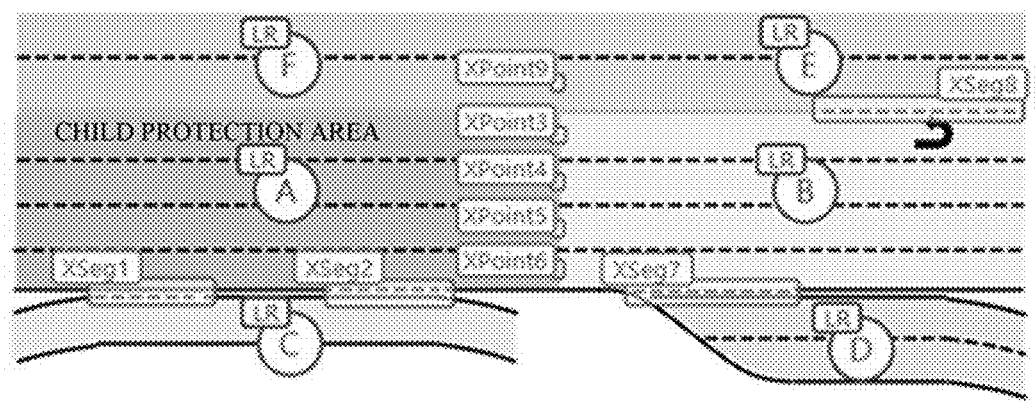
FIGS. 13A to 13C show diagrams exemplarily illustrating a form of a lattice road network generated according to a method of generating lattice road network data in various embodiments.

Referring to FIG. 12, in operation S310, the server 100 may generate one or more lattice roads (e.g., lattice road (LR), and LR_A, LR_B, LR_C, LR_D, LR_E, and LR_F in FIG. 13A) using the road network data. For example, the server 100 may generate one or more lattice roads by grouping one or more lanes satisfying preset conditions (for example, having the same attribute and moving physically or legally) among a plurality of lanes located in an area based on the road network data.

Figure 14:
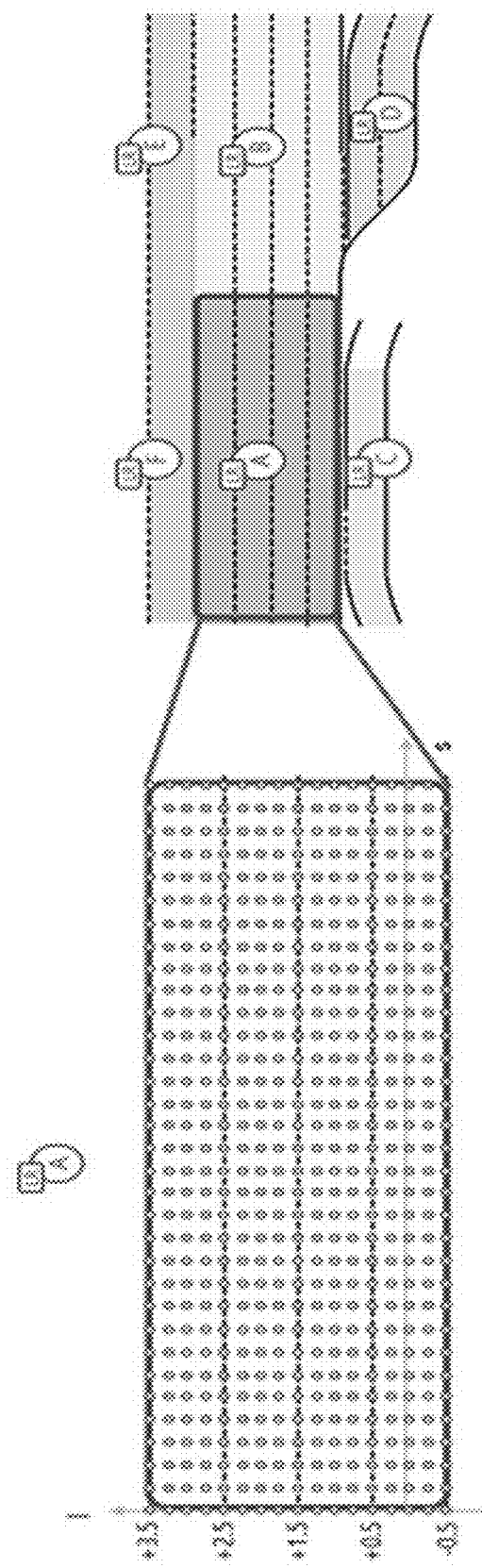
FIG. 14 is a diagram illustrating a process of setting a plurality of points on one or more lattice roads in various embodiments.

In various embodiments, the server 100 may set a plurality of points on one or more lattice roads in a lattice form, and match and store geometrical information and attribute information on a lattice road in which each of a plurality of points is located in each of a plurality of set points. For example, as illustrated in FIG. 14, the server 100 may set a plurality of points to have a lattice shape of a first distance (e.g., 1 m) unit to an S axis and a second distance (e.g., 0.25 m) unit to an L axis on a graph (S-L graph) for each of one or more lattice roads, and match and store geometric information (e.g., direction information, shape information, etc.) and attribute information (e.g., explicitness, whether there is a protection area, etc.) on a road on which each point is located for a plurality of set points. Here, the first distance to the S-axis and the second distance to the L-axis, at which a plurality of points are set, are merely examples and are not limiting but may be adjusted within a predetermined range.

In addition, the server 100 may further include geometric information (e.g., relative position information, etc.) and attribute information (e.g., type, color information) on a lane, with respect to one or more points located in a lane of one or more lattice roads among a plurality of points.

In addition, the server 100 may match and store geometric information and attribute information (e.g., direction indication information, type, speed information, etc.) for each lane, with respect to one or more points located in a lane included in each of one or more lattice roads among a plurality of points.

Figure 13B:
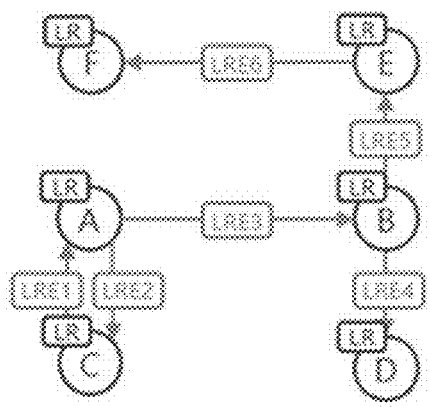
Figure 13C:
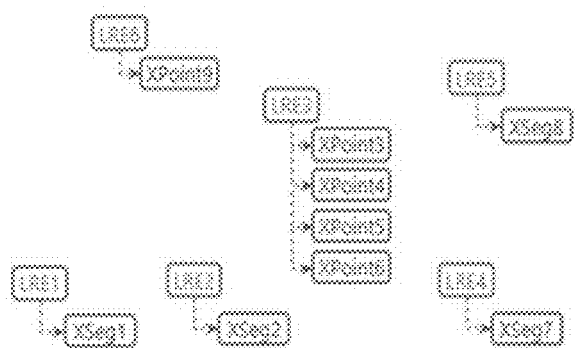

In operation S320, the server 100 may generate connection information (lattice road edge (LRE), and LRE1, LRE2, LRE3, LRE4, LRE5, and LRE6 of FIGS. 13B and 13C) between one or more lattice roads. For example, the server 100 may determine whether one or more lattice roads intersect, and may generate connection information indicating a connection relationship between the one or more lattice roads generated based on the determination on whether the one or more lattice roads intersect.

In this case, the server 100 may determine the type of connection information based on a length of an intersection section between one or more lattice roads. For example, as illustrated in FIGS. 13A to 13C, the server 100 intersects a first lattice road (LR_A) and a second lattice road (LR_B), but when the length of the intersection section is 0, may generate connection information (e.g., XPoint3, XPoint4, XPoint5, and XPoint6) in a point form.

Meanwhile, as illustrated in FIGS. 13A to 13C, when the first lattice road (LR_A) and the third lattice road (LR_C) intersect but have an intersection section having a predetermined length, that is, when the length of the intersection section is not 0, the server 100 may generate connection information (e.g., XSeg1 and XSeg2) in the form of a line having a predetermined length.

In operation S330, the server 100 may generate the lattice road network connecting one or more lattice roads generated through operation S310 according to the connection information generated through operation S320 (e.g., FIGS. 13B and 13C).

That is, the server 100 may be used to generate the short-term driving plan (e.g., a driving path from the first lattice included in one lattice road to the second lattice) for the autonomous driving vehicle 10 by generating the lattice road network data according to the above method.

Referring back to FIG. 3, in operation S130, the server 100 may generate a crossable dipole graph using lattice road network data generated through operation S120.

Here, the crossable dipole graph may be data used for the long-term driving plan for the autonomous driving vehicle 10.

In various embodiments, the server 100 may generate a crossable dipole graph connecting one or more different lattice roads using the lattice road network data.

First, the server 100 may determine whether movement is possible between one or more lanes included in a first lattice road and one or more lanes included in a second lattice road based on the lattice road network data.

Figure 15A:
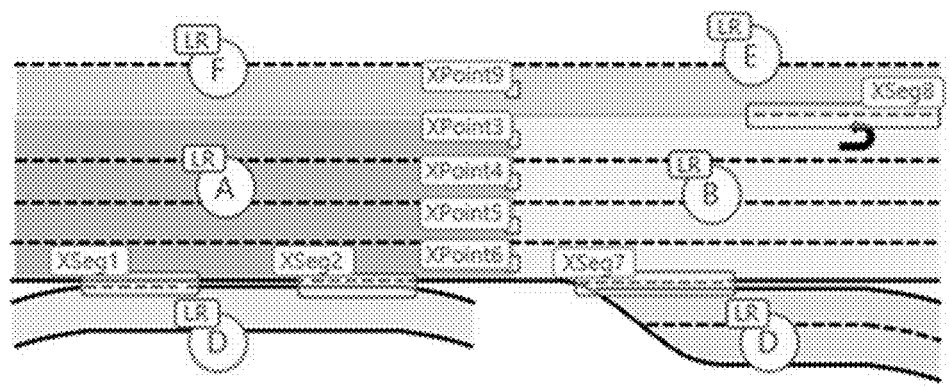
FIGS. 15A to 15C show diagrams illustrating a process of generating a crossable dipole graph using lattice road network data in various embodiments.
Figure 15B:
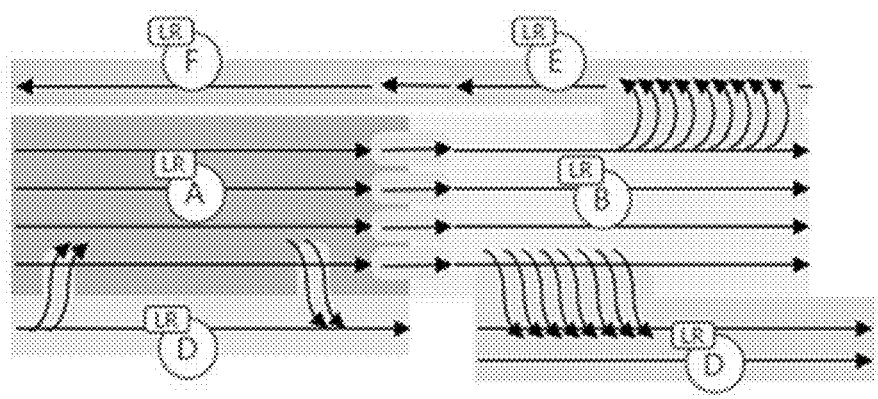
Figure 15C:
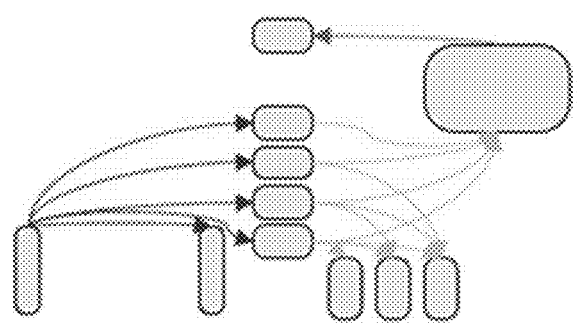

For example, as illustrated in FIGS. 15A to 15C, when a lane changeable section in a dotted form is set in a direction from a second lattice road (LR_B) to a fourth lattice road (LR_D), it is possible to move a lane from the second lattice road (LR_B) to the fourth lattice road (LR_D), but considering that a distance from a first lane of the second lattice road (LR_B) to the fourth lattice road (LR_D) is long and when changing lanes, vehicles need to sequentially change one lane at a time according to the Road Traffic Act, it may be practically impossible to move from the first lane of the second lattice road (LR_B) to the fourth lattice road (LR_D).

When the first lane of the second lattice road (LR_B) and the fourth lattice road (LR_D) are connected by a movable path without considering this point, other vehicles in the vicinity of the autonomous driving vehicle 10 may be exposed to dangerous situations or may experience inconvenience due to the autonomous driving vehicle 10 changing a lane from the first lane of the second lattice road (LR_B) to the fourth lattice road (LR_D) based on the driving plan generated according to the data, and a fine or demerit points may be imposed in accordance with Article 19 (Maintaining of Safe Distance, etc.) (3) (No driver of any motor vehicle shall change course when it is likely to impede normal traffic of other motor vehicles traveling in the direction to which he or she intends to change his or her route).

In consideration of this, the server 100 may determine whether movement is possible between lanes included in each of the first lattice road and the second lattice road, with respect to each of the interconnected first lattice road and second lattice road, and generate a crossable dipole graph that connects one or more lanes included in the first lattice road and one or more lanes included in the second lattice road based on the determination of whether movement is possible between lanes.

Here, the method of determining whether movement is possible between one or more lanes included in the first lattice road and one or more lanes included in the second lattice road may be made based on a distance between one or more lanes included in the first lattice road and one or more lanes included in the second lattice road and a change cycle (e.g., 30 m for general road, 100 m for expressway) for each lane according to attributes of a road under a length of an intersection section set between the first lattice road and the second lattice road, but is not limited thereto.

In various embodiments, the server 100 may generate the driving plan (short-term driving plan and long-term driving plan) for the autonomous driving vehicle 10 using the lattice road network data and the crossable dipole graph generated according to the above method.

Figure 16A:
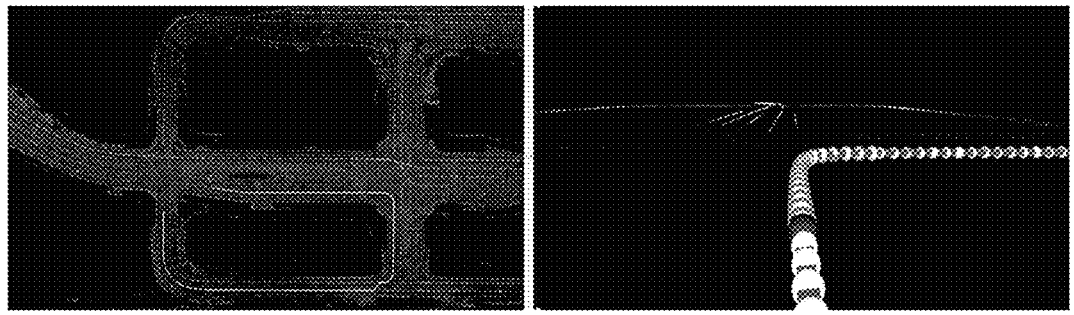
FIGS. 16A to 16C show diagrams illustrating a process of designing a driving plan for an autonomous driving vehicle using lattice road network data and a crossable dipole graph in various embodiments.
Figure 16B:
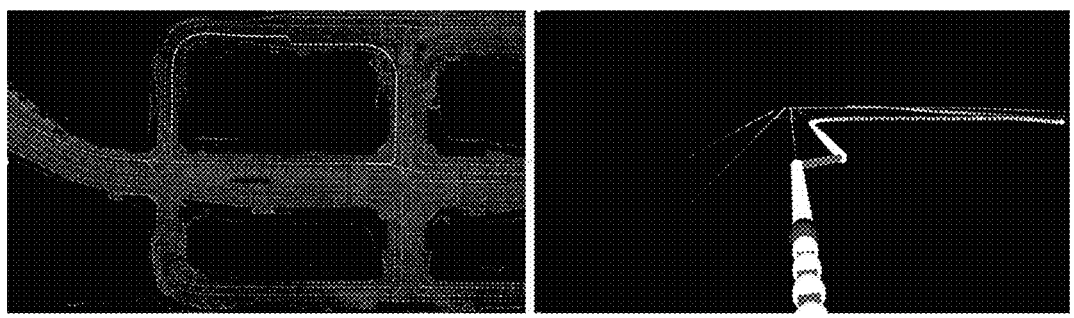
Figure 16C:
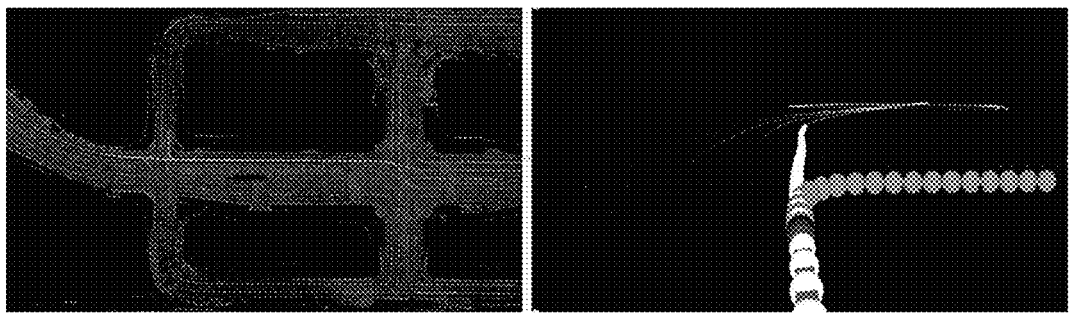

For example, as illustrated in FIGS. 16A to 16C, upon receiving information on a destination from a user, the server 100 may establish a long-term driving plan from a user's current location to the destination by using positional information of a user (or positional information of the autonomous driving vehicle 10 in which a user is riding), positional information on a destination that a user inputs, and a crossable dipole graph. For example, the server 100 may select one or more roads for driving from the user's current location to the destination using the crossable dipole graph, and generate the long-term driving plan connecting the selected one or more roads.

Thereafter, the server 100 may establish a short-term driving plan from the current location of the user to the destination using the lattice road network data. For example, the server 100 may generate a short-term driving plan for one or more roads selected using the crossable dipole graph by connecting a plurality of lattices set for each of one or more roads selected using the crossable dipole graph.

A method of creating a road network map to design a driving plan for an autonomous driving vehicle has been described above with reference to the flowchart illustrated in the drawings. For simple description, the method of creating a road network map to design a driving plan for an autonomous driving vehicle has been described by showing a series of blocks, but the present invention is not limited to the order of the blocks, and some blocks may be performed in an order different from that shown and performed herein, or may be performed at the same time. In addition, new blocks not described in the present specification and drawings may be added, or some blocks may be deleted or changed.

According to various embodiments of the present invention, it is possible to build a road network map by collecting various types of information on roads located in an area to generate road network data, and using the generated road network data to automatically generate lattice road network data and a crossable dipole graph, and to more accurately design a short-term driving plan and a long-term driving plan for an autonomous driving vehicle using the built road network map.

The effects of the present invention are not limited to the above-described effects, and other effects that are not described may be obviously understood by those skilled in the art from the following description.

Although embodiments of the present invention have been described with reference to the accompanying drawings, those skilled in the art to which the present invention belongs will appreciate that various modifications and alterations may be made without departing from the spirit or essential features of the present invention. Therefore, it is to be understood that the embodiments described hereinabove are illustrative rather than being restrictive in all aspects.

What is claimed is:

1. A method of creating a road network map to design a driving plan for an autonomous driving vehicle, which is performed by a computing device, the method comprising:
   receiving, from at least one of a user terminal and a vehicle, which are connected with the computing device via a network, sensor data for an area, or receiving, from an external service, which is connected with the computing device via the network, information on roads located in the area;
   generating, based on the sensor data or the information on roads, road network data for the area;
   generating, based on the generated road network data, lattice road network data for a first driving plan for an autonomous driving vehicle; and
   generating, based on the generated lattice road network data, a crossable dipole graph for a second driving plan for the autonomous driving vehicle,
   wherein the generating of the lattice road network data comprises:
   generating, based on the generated road network data, one or more lattice roads by grouping one or more lanes satisfying a preset condition among a plurality of lanes located in the area;
   setting a plurality of points positioned in a lattice form, on a respective lattice road of the generated one or more lattice roads;

matching and storing, for a respective point of the plurality of points, geometric information and semantic information of a road where the respective point is located;

generating connection information between the generated one or more lattice roads;

generating the lattice road network connecting the generated one or more lattice roads according to the generated connection information; and controlling the autonomous driving vehicle to drive according to the first driving plan and the second driving plan.

2. The method of claim 1, wherein the generating of the road network data includes:

generating a first road network indicating a connection relationship between a first road located in the area and a second road connected to the first road; and generating a second road network representing a connection relationship between a plurality of first lanes included in the first road and a plurality of second lanes included in the second road using the generated first road network.

3. The method of claim 2, wherein the generating of the first road network includes:

generating a first road graph and a second road graph by graphing the first road and the second road, respectively, the generated first road graph and the generated second road graph including shape information, direction information, and attribute information of the first road and the second road, respectively; and generating the first road network by connecting the generated first road graph and the generated second road graph.

4. The method of claim 2, wherein the generating of the first road network includes:

dividing each of the first road and the second road according to a preset criterion to generate one or more independent roads and one or more dependent roads; and generating the first road network by connecting the generated one or more independent roads and the generated one or more dependent roads, and intersecting and connecting one independent road and one dependent road.

5. The method of claim 2, wherein the generating of the second road network includes:

generating a first lane graph indicating relative positions of each of the plurality of first lanes and a second lane graph indicating the relative positions of each of the plurality of second lanes by graphing each of the plurality of first lanes and the plurality of second lanes, the generated first lane graph and the generated second lane graph including attribute information on the plurality of first lanes and the plurality of second lanes, respectively; and generating the second road network by connecting the generated first road graph and the generated second road graph.

6. The method of claim 1, wherein the preset condition has the same property and is physically and legally movable.

7. The method of claim 1, wherein the generating of the connection information comprises:

determining whether the generated one or more lattice roads have one or more intersections; and generating connection information indicating a connection relationship between the generated one or more lattice roads based on the determined one or more intersections, wherein when a length of an intersection section is 0, a form of the generated connection information is a point form, and when the length of the intersection section is not 0, the form of the generated connection information is a form of a line having a predetermined length.

8. The method of claim 1, wherein the generating of the crossable dipole graph includes:

determining whether movement is possible between one or more lanes included in a first lattice road and one or more lanes included in a second lattice road, based on a distance between one or more lanes included in the first lattice road and the one or more lanes included in the second lattice road and a change cycle for each lane according to attributes of a road under a length of an intersection section set between the first lattice road and the second lattice road; and generating the crossable dipole graph connecting one or more lanes included in the first lattice road and one or more lanes included in the second lattice road based on the determined movement possibility.

9. A server for creating a road network map to design a driving plan for an autonomous driving vehicle, the server comprising:

a processor;

a network interface;

a memory; and a computer program loaded into the memory and executed by the processor, wherein the computer program includes:

an instruction to receive, from at least one of a user terminal and a vehicle, which are connected with the server via a network, sensor data for an area, or receive, from an external service, which is connected with the server via the network, information on roads located in the area;

an instruction to generate, based on the sensor data or the information on roads, road network data for the area;

an instruction to generate, based on the generated road network data, lattice road network data for a first driving plan for a first driving plan for an autonomous driving vehicle; and an instruction to generate, based on the generated lattice road network data, a crossable dipole graph for a second driving plan for the autonomous driving vehicle, wherein the instruction to generate the lattice road network data comprises:

an instruction to generate, based on the generated road network data, one or more lattice roads by grouping one or more lanes satisfying a preset condition among a plurality of lanes located in the area;

an instruction to set a plurality of points positioned in a lattice form, on a respective lattice road of the generated one or more lattice roads;

an instruction to match and store, for a respective point of the plurality of points, geometric information and semantic information of a road where the respective point is located;

an instruction to generate connection information between the generated one or more lattice roads;

an instruction to generate the lattice road network connecting the generated one or more lattice roads according to the generated connection information; and an instruction to control the autonomous driving vehicle to drive according to the first driving plan and the second driving plan.

10. A non-transitory computer readable medium coupled with a hardware computing device, storing a program that is configured to execute:
   receiving, from at least one of a user terminal and a vehicle, which are connected with the computing device via a network, sensor data for an area, or receiving, from an external service, which is connected with the computing device via the network, information on roads located in the area;
   generating, based on the sensor data or the information on roads, road network data for the area;
   generating, based on the generated road network data, lattice road network data for a first driving plan for an autonomous driving vehicle; and
   generating, based on the generated lattice road network data, a crossable dipole graph for a second driving plan for the autonomous driving vehicle,
   wherein the generating of the lattice road network data comprises:
      generating, based on the generated road network data, one or more lattice roads by grouping one or more lanes satisfying a preset condition among a plurality of lanes located in the area;
      setting a plurality of points positioned in a lattice form, on a respective lattice road of the generated one or more lattice roads;
      matching and storing, for a respective point of the plurality of points, geometric information and semantic information of a road where the respective point is located;
      generating connection information between the generated one or more lattice roads;
      generating the lattice road network connecting the generated one or more lattice roads according to the generated connection information; and
      controlling the autonomous driving vehicle to drive according to the first driving plan and the second driving plan.

* * * * *